US007204056B2

United States Patent
Sieverding

(10) Patent No.: US 7,204,056 B2
(45) Date of Patent: Apr. 17, 2007

(54) PLANT POT MADE FROM DEEP-DRAWN PLASTIC

(75) Inventor: Alfons Sieverding, Lohne-Brockdorf (DE)

(73) Assignee: Poeppelmann Holding GmbH & Co., KG (DE)

( * ) Notice: Subject to any disclaimer, the term of this patent is extended or adjusted under 35 U.S.C. 154(b) by 0 days.

(21) Appl. No.: 10/604,298

(22) Filed: Jul. 9, 2003

(65) Prior Publication Data

US 2004/0107637 A1    Jun. 10, 2004

Related U.S. Application Data

(63) Continuation of application No. PCT/EP02/09566, filed on Aug. 28, 2002, now abandoned.

(30) Foreign Application Priority Data

Sep. 6, 2001    (DE) ............................ 201 14 785 U

(51) Int. Cl.
*A01G 9/02* (2006.01)
*B65D 1/42* (2006.01)
*B65D 21/00* (2006.01)

(52) U.S. Cl. ................ 47/65.5; 47/65; 47/65.7; 206/423; 206/519; 206/515; 206/505; 248/27.8; 220/656; 220/671; 220/675

(58) Field of Classification Search ....... D11/152–154, D11/143; 206/423, 519, 515, 514, 505, 499; 248/27.8; 47/65.5, 32.7, 65, 66.1, 66.7, 73, 47/75, 65.7, 66.5, 83; 220/657, 659, 656, 220/671, 417, 672, 673, 675; 215/10, 382
See application file for complete search history.

(56) References Cited

U.S. PATENT DOCUMENTS

D65,842 S  * 10/1924  Gottogon .............. D11/151

(Continued)

FOREIGN PATENT DOCUMENTS

| EP | 0 065 108 | 11/1982 |
| EP | 65108 A1 | * 11/1982 |
| EP | 1110870 A1 | * 12/1999 |
| EP | 1 092 343 | 4/2001 |
| GB | 859 964 | * 6/1959 |
| GB | 859 964 | 1/1961 |
| JP | 03352940 | * 7/1993 |
| JP | 05213358 | * 8/1993 |

OTHER PUBLICATIONS

English translation of Japanese Patent JP 05-213358 A to Yosomiya (Aug. 24, 1993) 18 pages.*

*Primary Examiner*—Andrea Valenti
(74) *Attorney, Agent, or Firm*—Porter, Wright, Morris & Arthur, LLP

(57) ABSTRACT

A stackable deep-drawn plastic container has an at least slightly conical wall and a bottom connected to the conical wall. The wall has a rim area remote from the bottom. The rim area has a first ledge and a second ledge located below the first ledge. It also has an intermediate support area having a first end connected to the first ledge and a second end connected to the second ledge. A stacking spacing of the deep-drawn plastic container when stacked in a stack is determined by the first and second ledges. The first and second ledges in a plan view onto the rim area overlap at least partially. The intermediate support area has a first width at the first ledge that is smaller than a width at the second ledge. The intermediate support area has a wave shape at least at one of the first and second ends.

12 Claims, 4 Drawing Sheets

U.S. PATENT DOCUMENTS

| | | | |
|---|---|---|---|
| 2,253,817 A * | 8/1941 | Simmons | 47/65.6 |
| 2,335,260 A * | 11/1943 | Chamerlain | 220/657 |
| 3,045,887 A * | 7/1962 | Caine | 229/400 |
| 3,091,360 A * | 5/1963 | Edwards | 206/520 |
| D202,507 S * | 10/1965 | Shelby | D7/523 |
| 3,288,340 A * | 11/1966 | Shapiro et al. | 206/519 |
| 3,353,707 A * | 11/1967 | Eyles | 206/519 |
| 3,653,362 A * | 4/1972 | Davis | 119/61.5 |
| 3,721,367 A * | 3/1973 | Fletcher | 206/519 |
| 3,785,088 A * | 1/1974 | Guarriello | 47/65.5 |
| D235,909 S * | 7/1975 | Insalaco | D11/152 |
| 3,896,587 A | 7/1975 | Insalaco | 47/34 |
| D240,956 S * | 8/1976 | Holmes | D11/152 |
| 3,973,316 A * | 8/1976 | Maher | 29/416 |
| D241,764 S * | 10/1976 | Anderson et al. | D11/152 |
| D256,682 S * | 9/1980 | Lee et al. | D11/152 |
| 4,291,493 A * | 9/1981 | Monson | 47/14 |
| 4,715,144 A * | 12/1987 | Lee | 47/66.6 |
| 4,863,058 A * | 9/1989 | Antoni et al. | 220/675 |
| 5,761,848 A | 6/1998 | Manlove | 47/66 |
| 6,134,832 A | 10/2000 | Bokmiller et al. | 47/66.1 |

* cited by examiner

PLANT POT MADE FROM DEEP-DRAWN PLASTIC

CROSS REFERENCE TO RELATED APPLICATIONS

This is a continuation of International Application PCT/EP02/09566 with an international filing date of Aug. 28, 2002, not published in English under PCT Article 21(2), and now abandoned.

BACKGROUND OF INVENTION

1. Field of the Invention

The invention relates to a plant pot or a similar plastic container of deep-drawn plastic material having a stackable basic shape that is at least somewhat conical, wherein the stacking spacing is determined by two ledges which, in a plan view, at least partially overlap one another and which are connected to one another by an intermediate support area. In contrast to the shape needed for stackability, the intermediate support area has a width at the upper ledge that is smaller than a width at the lower ledge.

2. Description of the Related Art

In the case of stacking pots or containers, usually a coaxial stacking arrangement with a precisely defined stacking spacing or distance is demanded in order to provide predetermined packing conditions, to prevent jamming of the pots relative to one another, and to enable, if desired, an automated removal from the stack. In this connection, it is expedient to provide peripheral ledges as support surfaces in the area of the upper wall or in the area of the upper rim, wherein the upper rim itself may form such a ledge. Two stacked pots are then precisely positioned relative to one another with respect to their (axial) height, and also, if needed, centered, and are not pushed and jammed into one another as a result of the weight of high stacks or ambient loads.

However, two matching ledges in this context, which have substantially horizontally extending surfaces that face upwardly or downwardly and overlap in a plan view, cannot be easily realized in the case of deep-drawn pots because they require a Z-shaped course of the wall where the ledges are connected to one another by means of an intermediate support area. This intermediate support area extends conically opposite to the general conical configuration of the pot and presents an undercut when removing the pot from the deep-drawing mold.

During the shaping process, the pot rests against the inner side of a hollow mold and cannot be easily removed from this mold; instead, it is secured in this mold like a snap fastener and must be removed by overcoming this undercut. This is possible only to a limited extent. In the case of round plant pots having approximately a pot diameter between 8 and 20 cm made of polypropylene material, such undercuts are conventionally only provided so as to have a range of 0.5 to 1 mm (in any case, less than 1 percent of the pot diameter). Accordingly, the annual support surfaces of stacked pots are limited. The risk that the pots in the stack will deform under their own weight or when receiving external pressure and will slide into one another at least over portions of their periphery is significant. Such pots can be manually removed from their stacks only with difficulty, and automated removal is generally not possible at all. At the same time, the deformation in the stack creates the risk of overloading and damaging of the material as well as, for example, in the case of extended storage, the risk of permanent deformation.

SUMMARY OF INVENTION

It is therefore an object of the present invention to configure a plant pot or other plastic container having a stackable shape such that it can be removed from the mold after deep-drawing by a production-friendly, quick removal step and, at the same time, provides a load-resistant, precisely spaced-apart stacking position during stacking, during transport as well as for removal from the stack for further use of the pot, in particular, also for automated removal from the stack.

In accordance with the present invention, this is achieved in that the intermediate support area has a wave shape at least at one end adjoining one of the two ledges.

The decisive step in regard to overcoming the contradictory requirements of excellent removability from the mold and excellent stacking properties resides in the wave-shaped configuration of the intermediate support area at least at one end adjoining one of the two ledges. This wave-shaped configuration can be provided in different shapes. Rounded S-shaped or sine-shaped curved portions as well as rectangular wave shapes and sawtooth shapes or zigzag shapes are possible. The outwardly projecting wave-shaped areas must not be mirror-symmetrical to the inwardly projecting wave areas; small as well as wide shaped portions as well as alternating or irregular sizes are possible.

It is important that the smooth rim contour is dissolved by the wave shape and is therefore designed to yield. In this way, at least a partial deformation and thus also removability in the case of larger undercuts and also larger contact areas of the ledges on one another can be obtained with a Z-shaped area comprised of the ledges and the intermediate support area.

In principle, the intermediate support area in its entirety can be wave-shaped; however, a wave shape adjoining one of the two ledges can be sufficient in order to ensure removal from the mold. Inasmuch as one of the two ledges is realized in the form of the upper, usually stiff, pot rim, the adjoining area to the lower ledge will be considered primarily in order to provide the desired yielding action. However, when both ledges are arranged in an area of much reduced wall thickness, the upper ledge can also be designed to have a corresponding yielding action by providing a wave shape of the adjoining intermediate support area. This area is then not compressed but expanded upon removal from the mold.

The yielding action of the pot, to be provided according to the invention in the area of the ledges, is not only important in connection with round pots, i.e., pots with an annular rim, it is advantageous in the same way also for rectangular pots and would also be important in connection with special shapes, such as oval pots or hexagonally shaped or octagonally shaped pots. It is important in connection with the yielding action of the pot in the cross-sectional plane to resolve the large smooth wall structures and to incorporate a shape elasticity in this connection that surpasses the elasticity of the material with respect to pure pressure load or tensile load. In this connection, it is expedient that the wave shape provides divisions in the circumferential direction which are smaller than the dimensions of the intermediate support area or, at least, do not surpass them significantly.

DETAILED DESCRIPTION

Figure 1:
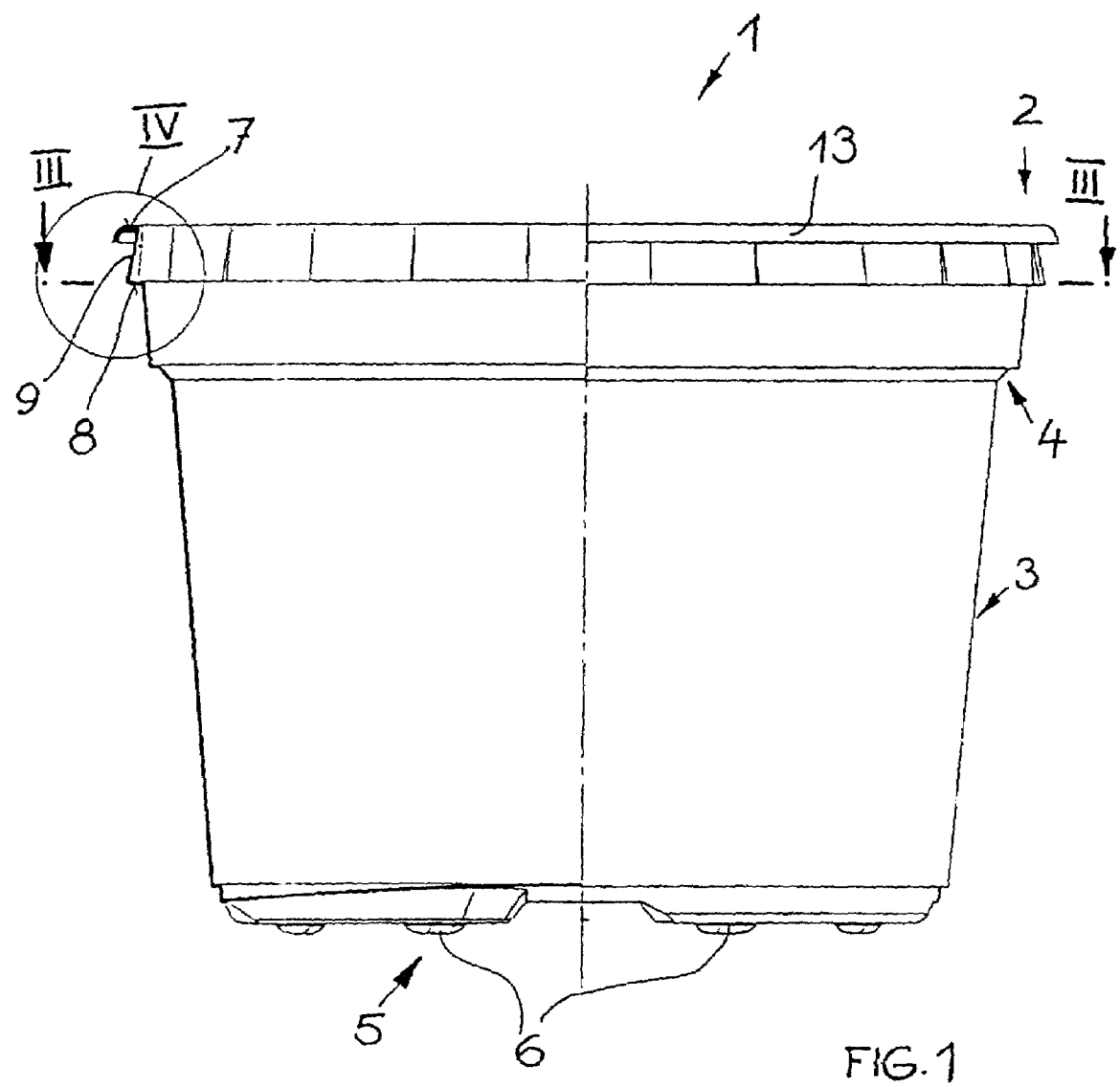
FIG. 1 is a side view of a plant pot according to the invention, wherein the left side of the drawing shows a section view.

The plastic container in the form of a plant pot 1 illustrated in FIG. 1 is a deep-drawn plastic part produced from a flat sheet or film and stamped. As a result of the shaping process, it has accordingly a pot shape with a simple continuous and unbranched wall comprising a generally conical pot wall 3, a bottom 5, and, at the top, a rim area 2. The pot wall 3 has an incorporated step 4 for reinforcement purposes; for reinforcement purposes and for effecting drainage of the pot, the bottom 5 is provided with a profiling which is not illustrated in detail. The bottom 5 has cup-shaped legs 6 for spacing it from a surface onto which it is placed. Moreover, the plant pot 1 is provided in the bottom area with holes (not illustrated) for watering and drainage purposes. The plant pot 1 shaped accordingly has a generally downwardly tapering shape, which goes hand in hand with the requirements for ease of removal from the hollow mold, on whose inner side the formed pot rests, after deep drawing as well as the requirement of stackability by means of a space-saving insertion of the pots into one another, wherein the pots are also centered in this way with minimal play so that the end user, for example, a professional gardening or landscaping operation, can precisely remove the pots from the stack with automation means.

However, in the case of stacking not only a relative centering action and coaxial alignment of the pots in the stack is to be provided, but also a defined stacking distance of the pots relative to one another. Also, it should be prevented that the pots will jam relative to one another in order to avoid difficulties when removing them from the stack. For this purpose, a rim area 2 that has a cross-sectional Z-shape, as illustrated in the detail IV of FIG. 1, is provided; such rim areas are generally known in the case of deep-drawn plant pots. In this connection, an upper ledge 7 for placing an additional pot on top and a lower ledge 8 for supporting the pot on the upper rim of a pot arranged underneath are provided. The two ledges 7 and 8 must therefore overlap one another for providing a supporting function of the stacked arrangement; this has the result that the wall between the ledges 7, 8, which during stacking provides a supporting area 9, must be configured to be recessed in the upper direction. This intermediate support area which has a smaller width at the upper ledge 7 in comparison to the lower ledge 8, presents a problem for the removal of the pot after deep drawing from a deep drawing mold positioned external to the pot, from which mold the pot is to be pushed out in the axial direction. The pushing action requires that the newly formed pot is not freely but easily removable by using its yielding properties resulting from its material and its shape. This is possible only to a limited extent; and in this connection sensitivity of the formed pot, not yet completely hardened, must be taken into consideration.

Figure 2:
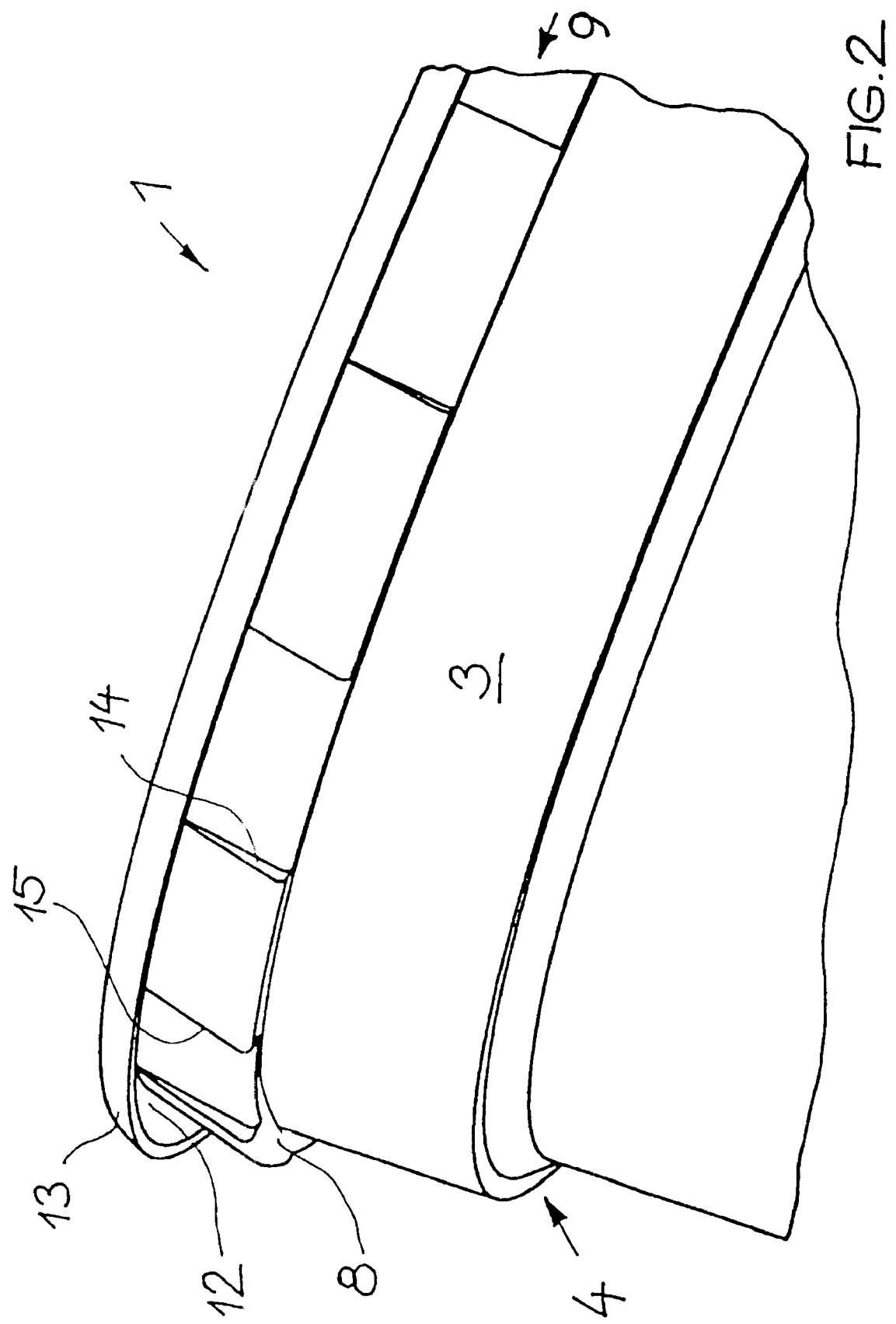
FIG. 2 is a partial view of the plant pot according to FIG. 1 viewed from the bottom of the plant pot.
Figure 3:
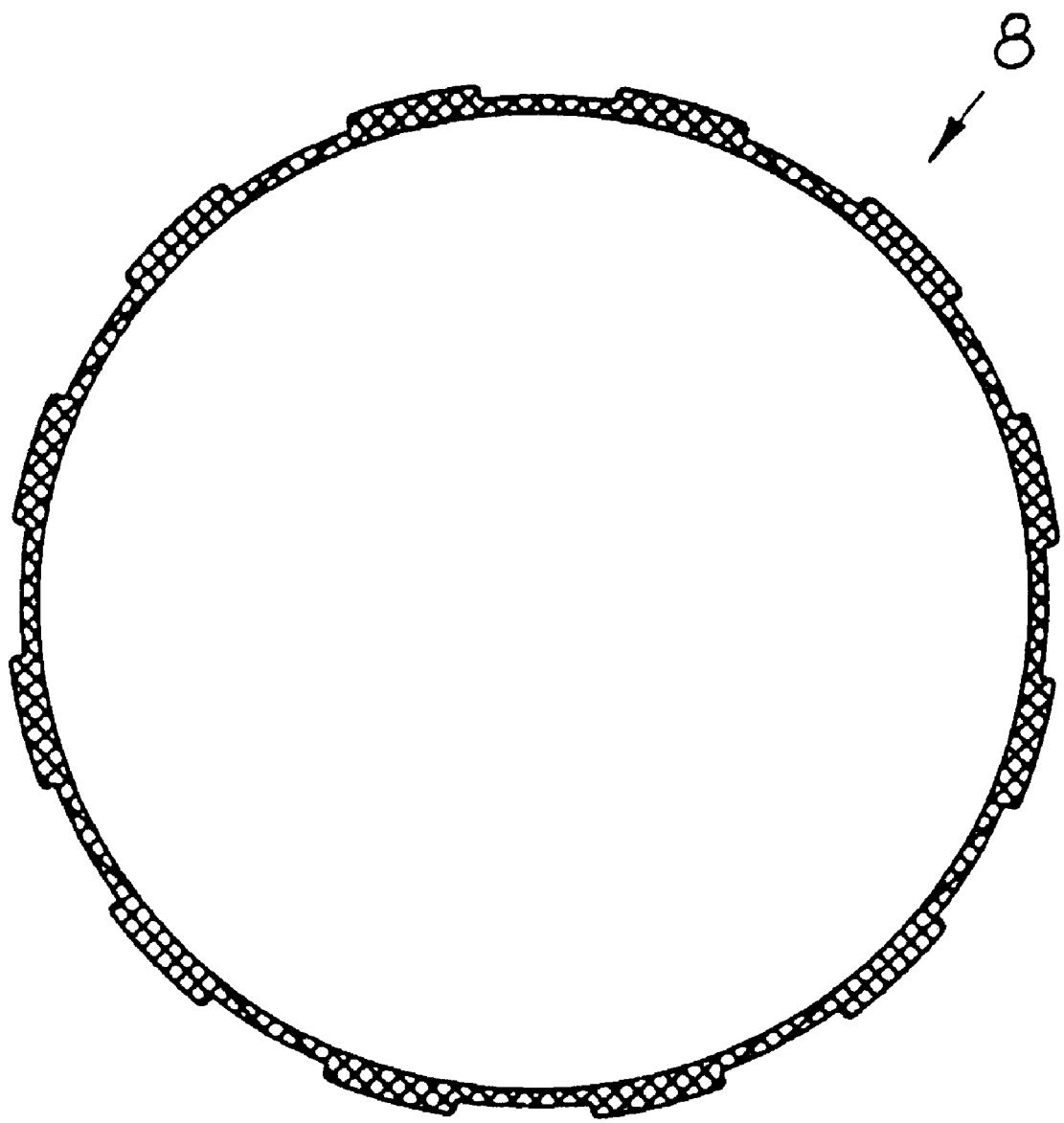
FIG. 3 shows a section along the line III—III of FIG. 1.

As illustrated, in particular, in FIGS. 1 and 2, the peripheral intermediate support area 9 has a special configuration. Viewed in the circumferential direction, it is of a rectangular wave shape. FIG. 3 shows that the outer contour of the lower ledge 8, where it passes into the intermediate support area 9, has also a matching wave shape. Viewed in cross-section of the plant pot, the wave shape (its amplitude) decreases from ledge 8 to ledge 7. In this way, the conflict between providing an overlap of the ledges 7 and 8 as large as possible for a reliable and stable stacking, on the one hand, and excellent removability from the mold, on the other hand, can be solved. The wave shape of the intermediate support area 9 softens the cross-sectional stiffness of the support rim as caused by a line following a smooth continuous shape, which is a circular shape in the illustrated case. The wave shape of the support area provides a wall enlargement and wall reduction; in particular, it provides deflections of the wall from the pressure line, assumed to be annular, during removal from the mold. For an intermediate support area as wide as possible of the stacked pots between the respective ledges 7 and 8, a wave shape of the intermediate support area or a wave-shaped contour of the ledges (FIG. 3) is advantageous because it is the contour that is essential. In this respect, as well as with respect to the yielding action of the intermediate support area 9 and of the lower ledge 8 during removal from the mold, it is however of interest to configure the divisions (defined by the wave shape) of the intermediate support area 9 not significantly greater than the dimensions of the intermediate support area 9 so that the deformations, caused when pushing out the pot blank from the deep drawing mold as well as when being loaded during stacking, are introduced on a short path and with minimal deformations into the residual pot shape.

Figure 4:
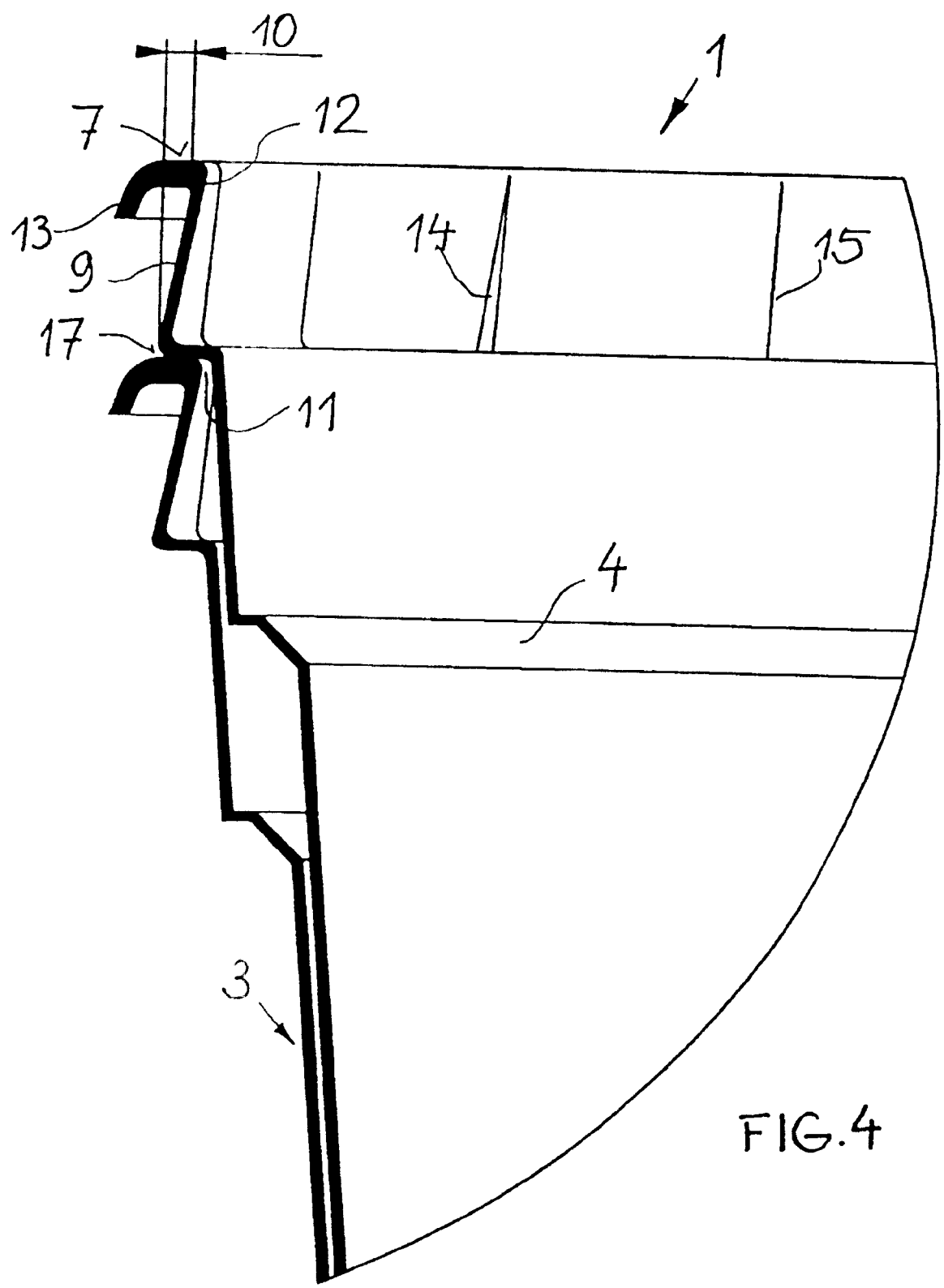
FIG. 4 shows a detail of the section area IV of FIG. 1 in correlation with a second plant pot in a stacked arrangement.

The stacking situation of two inserted plant pots is illustrated particularly well in the section illustration according to FIG. 4. By means of witness line 10 the size of the undercut is illustrated as a radius difference of the intermediate support area 9 at the exterior between its transition into the lower ledge 8 and into the upper ledge 7. The size of the undercut 10 shows, on the one hand, the displacement by which the lower part of the intermediate support area 9 and the lower ledge 8 must be pushed in when removing the pot from the mold. On the other hand, this size 10, when adding the wall thickness of the intermediate support area 9, indicates the overlap of the ledges, for example, with respect to the upper ledge 17 of an identical pot in the stack which is available as an annual support surface. It is also of interest in this connection that the pots can be moved as little as possible centrally relative to one another and do not overlap, for example, in one circumferential area to a greater extent and thus slide into one another on the opposite side. Accordingly, it is usually provided that the pots in the stack have little play relative to one another wherein preferably in the plane of the upper ledge 7 an annular play 11 (FIG. 4) of only 0.1 mm is provided.

With the wave shape of the intermediate support area, an important problem can be eliminated in the case of deep-drawn plant pots, which gain in market share because of a series of important advantages with respect to total weight, manufacturing costs, or strength in comparison to injection-molded plastic pots, which generally with respect to configuring special shapes, for example, stacking shoulders, provide a wider range of possibilities. In regard to the wave shape, it is not a certain configuration that is important as long as the wave shape of the intermediate support area and the corresponding contour of the ledge that is to be deformed mainly, provide a sufficient yielding action. A vertical profiling is preferred for orienting the wave shape, as illustrated in the shown rectangular waves with edges extending from the top to the bottom. Yielding of the intermediate support area 9 is to be increased only in the peripheral direction while the intermediate support is not to be softened with respect to the distance or area 9 spacing between the ledges 7 and 8. The vertically extending lateral displacement surfaces 14, 15 or "facets" of the rectangular wave shape or even act as reinforcements. These displacement surfaces 14, 15 taper in a wedge-shape upwardly so that the ledge 8 has the contour illustrated in FIG. 2, but the ledge 7 has expediently an uninterrupted, continuously extending inner edge beneficial for handling as well as centering of the pots relative to one another. In the present case, the ledge to be deformed is, of course, the lower ledge 8 because the upper ledge 7 is at the same time a part of the upper flange rim 12 with peripherally downwardly bent edge 13; the flange rim 12, as a result of the deep drawing process, is not only particularly strong with respect to its size and shape but also by maintaining the greater wall thickness. It is understood that in other cases that the upper ledge 7 can also be designed to be yielding or both ledges 7, 8, together with the intermediate support area, contribute significantly to the removability from the mold. This would be an obvious choice when the ledges provided for stacking were moved from the upper ledge in the downward direction into the pot wall; this is principally possible but is usually not desirable in the case of accessing the pots by means of an automated stacking tool.

While specific embodiments of the invention have been shown and described in detail to illustrate the inventive principles, it will be understood that the invention may be embodied otherwise without departing from such principles.

What is claimed is:

1. A stackable deep-drawn plastic plant pot comprising:
    an at least slightly conical wall (3) and a bottom (5) connected to the conical wall (3);
    wherein the conical wall (3) has a rim area (2) remote from the bottom (5);
    wherein the rim area (2) is comprised of an upward-facing first ledge (7) and a downward-facing second ledge (8), located below the first ledge (7);
    wherein the rim area (2) comprises an intermediate support area (9) having a first end connected to the first ledge (7) and a second end connected to the second ledge (8);
    wherein a stacking spacing of the deep-drawn plastic plant pot, when stacked in a stack, is determined by the first and second ledges (7, 8);
    wherein the first and second ledges (7, 8), in a plan view onto the rim area (2), at least partially overlap;
    wherein the intermediate support area (9) has a wave shape at least at one of the first and second ends which softens a cross-sectional stiffness of the rim area to permit deformation of the rim area for improved removal from a deep drawing mold;
    wherein divisions having a width defined by the wave shape are not significantly greater than a height of the intermediate support area so that deformations of the rim area during removal from the deep drawing mold are introduced over the width of each of the divisions and with minimal deformations into the residual shape of the plastic plant pot;
    wherein the second ledge (8) has a contour matching the wave shape of the intermediate support area (9) and overlaps in a plan view radially at least most of a radial width of the first ledge (7);
    wherein the second ledge (8) continuously extends uninterrupted over an entire periphery of the plant pot;
    wherein the first ledge (7) forms an upper flange rim (12) of the rim area (2);
    wherein the upper flange rim (12) has a wall thickness that is greater than a wall thickness of the remaining parts of the plastic plant pot; and
    wherein an inner edge of the first ledge is larger in the radial direction than an inner edge of the second ledge;
    wherein the inner edge of the first ledge and the inner edge of the second ledge are sized to form an annular play of 0.1 mm therebetween when stacked in a stack.

2. The deep-drawn plastic plant pot according to claim 1, wherein the wave shape of the intermediate support area (9) is a rectangular wave shape.

3. The deep-drawn plastic plant pot according to claim 1, wherein the wave shape forms divisions in the circumferential direction which are not significantly greater than dimensions of the intermediate support area (9).

4. The deep-drawn plastic plant pot according to claim 1, wherein the wave shape is continued across the intermediate support area (9) at least with reduced amplitude from the one of the first and second ends to the other of the first and second ends.

5. The deep-drawn plastic plant pot according to claim 1, wherein the intermediate support area (9) within the wave shape has primarily vertically extending surfaces or lines.

6. The deep-drawn plastic plant pot according to claim 1, wherein at least one of the first and second ledges (7, 8) forms a centering means for a play-reduced centering relative to a neighboring deep-drawn plastic container when stacked in a stack.

7. The deep-drawn plastic plant pot according to claim 1, wherein the upper flange rim (12) has an outer downwardly bent edge (13).

8. The deep-drawn plastic plant pot according to claim 1, wherein the wave shape is sized and shaped to permit deformation of at least the second ledge during removal from a deep drawing mold.

9. The deep-drawn plastic plant pot according to claim 1, wherein the wave shape softens the cross-sectional stiffness of the rim area but does not soften a longitudinal stiffness of the rim area.

10. The deep-drawn plastic plant pot according to claim 1, wherein the intermediate support area has a reverse taper.

11. The deep-drawn plastic plant pot according to claim 1, wherein the wave shape is wedge shaped in the vertical direction so that the first ledge has a contour uninterrupted by the wave shape of the intermediate support area.

12. The deep-drawn plastic plant pot according to claim 1, wherein the plant pot is not resiliently deformed when stacked in a stack.

* * * * *